United States Patent
Wu

(10) Patent No.: US 7,298,696 B1
(45) Date of Patent: Nov. 20, 2007

(54) BLOCKAGE MITIGATION TECHNIQUES FOR INFORMATION TRANSMISSION

(76) Inventor: William W. Wu, 6 Spruce Tree Ct., Bethesda, MD (US) 20814-1625

( * ) Notice: Subject to any disclaimer, the term of this patent is extended or adjusted under 35 U.S.C. 154(b) by 197 days.

(21) Appl. No.: 10/963,527

(22) Filed: Oct. 14, 2004

(51) Int. Cl.
 *H04L 1/00* (2006.01)
(52) U.S. Cl. .......................... 370/229; 714/47; 714/748
(58) Field of Classification Search ................ 370/216, 370/229, 311; 455/45, 67.3; 714/48, 790, 714/490, 748, 789; 375/224
See application file for complete search history.

(56) References Cited

U.S. PATENT DOCUMENTS

| | | | |
|---|---|---|---|
| 4,649,543 | A | 3/1987 | Levine |
| 5,185,711 | A | 2/1993 | Hattori |
| 5,282,207 | A | 1/1994 | Jurkevich et al. |
| 5,613,065 | A * | 3/1997 | Ishibashi et al. ............... 714/48 |
| 5,668,880 | A | 9/1997 | Alajajian |
| 5,710,785 | A * | 1/1998 | Yagi ........................... 714/789 |
| 5,742,599 | A | 4/1998 | Lin et al. |
| 5,864,554 | A | 1/1999 | Rostoker et al. |
| 5,886,989 | A | 3/1999 | Evans et al. |
| 6,947,479 | B2 * | 9/2005 | Varma et al. ................ 375/224 |
| 7,000,174 | B2 * | 2/2006 | Mantha et al. ............... 714/790 |
| 7,082,107 | B1 * | 7/2006 | Arvelo ........................ 370/311 |
| 7,143,330 | B2 * | 11/2006 | Ahn et al. ................... 714/748 |
| 2001/0003089 | A1 * | 6/2001 | Kroeger et al. ............... 455/45 |
| 2003/0022629 | A1 * | 1/2003 | Miyoshi et al. ............ 455/67.3 |

* cited by examiner

Primary Examiner—Chi Pham
Assistant Examiner—Albert T. Chou
(74) Attorney, Agent, or Firm—James Creighton Wray; Clifford D. Hyra

(57) ABSTRACT

Transmission channel monitoring, detection, classification, and adaptation provide solutions to severe information blockage problems during transmission. Channel monitoring is achieved through two types of detection and re-transmission strategies. Channel detection is accomplished by means of counting the number of negative acknowledgements, which classifies the channel degradation level and determines which alternatives to be adapted in order to combat specific blockage phenomenon. Blockage level is first translated into and related to transmission link parameters in terms of total carrier power to noise ratios, from which the methods of bit rate reduction, modem density increasing, and higher encoding rate are brought forth. A blockage identifier and the optimal smearing technique are used. Frequency-diversity and space-diversity, a method for combating complete blockage and an adaptive programmable channel equalization technique independent of channel characteristics are described. A cascading technique is taught to improve significantly false- and miss-detection probabilities. Performance measures are established in terms of system efficiency and error probability for blockage mitigation with unequal terminal capabilities.

28 Claims, 6 Drawing Sheets

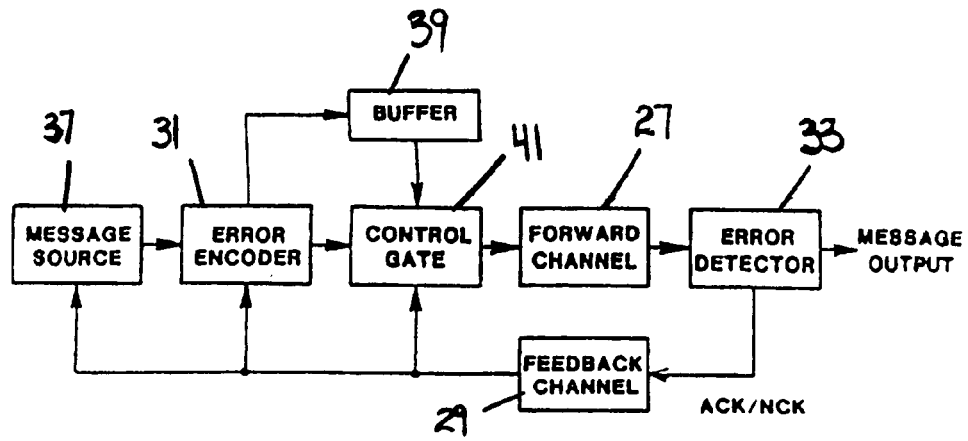
Figure 4. ARQ Arrangement with Forward and Feedback Transmission Channels
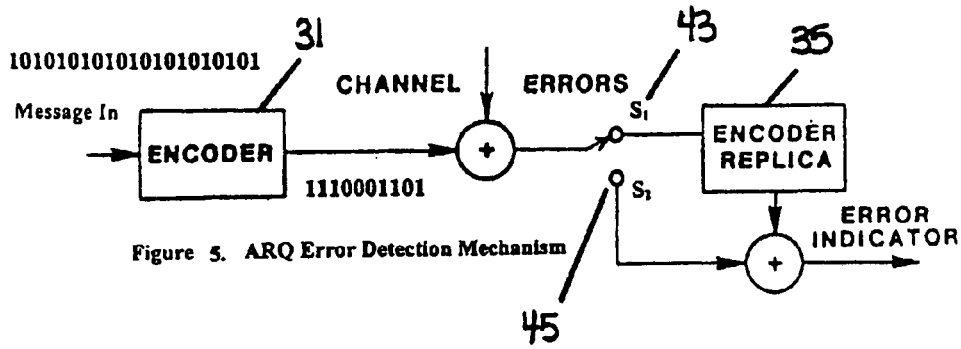
Figure 5. ARQ Error Detection Mechanism
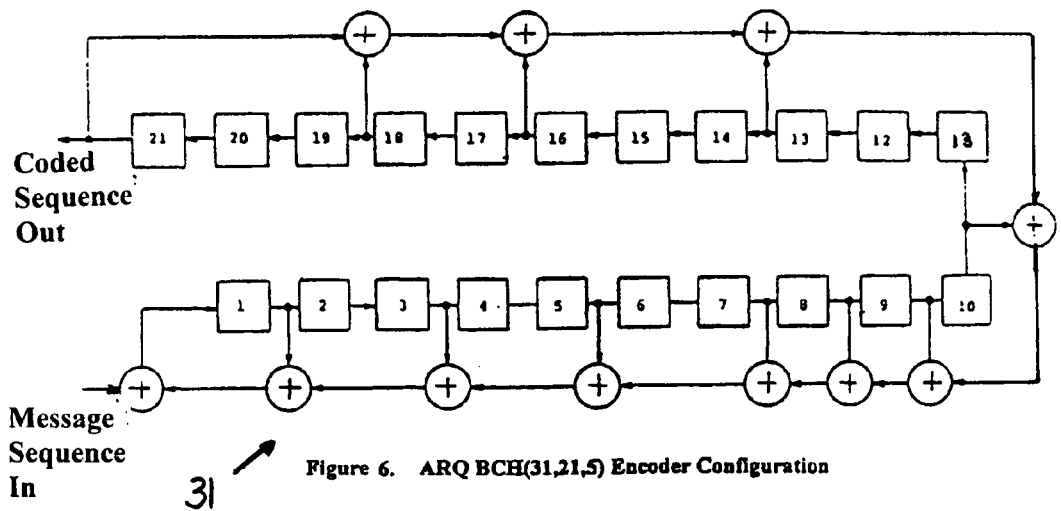
Figure 6. ARQ BCH(31,21,5) Encoder Configuration

US 7,298,696 B1

BLOCKAGE MITIGATION TECHNIQUES FOR INFORMATION TRANSMISSION

FIELD OF THE INVENTION

The field of this invention is in the area of providing solutions on information blockage problems due to transmission channel degradation.

BACKGROUND OF THE INVENTION

The significance of the blockage mitigation problems in information transmission has been addressed and identified by many for example: The U.S. Department of Defense components advocate mobile satellite communications. In 2004 the Air Force issued a request for proposal for 40 Gbps laser satellite communications with severe transmission degradation. The Army established the Future Combat System/Objective Force (FCS/OF) including satellites in 2003. The Navy requested innovative technologies in 2002 to support reliable and time critical multimedia information transmission for ships on the sea and submarines under the sea, where transmission channel characteristics are different. All components-addressed in satellite controlled UAVs (unmanned air vehicles), where operational hostile environment is unpredictable.

Particular difficulty includes a satellite communication-on-the-move that encompasses acknowledgement-based protocols to recognize severe disruption in service and to employ appropriate correction techniques. Protocol analysis needs to ensure signal quality is maintained in the presence of errors during transmission, as well as maintaining quality of service (QoS) if the signal is blocked. An optimal solution is always sought to maintain QoS within the network. Demands for optimal solutions have not been met due to the difficulty of the problem. Existing techniques are neither adequate nor optimal.

All transmission-blocking phenomena are time dependent and probabilistic. Previous studies have documented actual measurement by NASA/JPL of the Advanced Communications Technology Satellites (ACTS) Ka-band under heavy shadowed environments and have concluded that the 1% fade factor for Ka-band is well in excess of 30 dB, and may be as high as 45 dB. When a channel is multipath, space-time coding with multiple antennas can be useful. Among the well-known solutions is BLAST (Bell Laboratories Layered Space Time), which has multiple antennas. The idea of BLAST is to demodulate the desired signal and remove the rest, but, error propagation exists and ordering in detection is necessary.

Trellis Coded Modulation (TCM) has been advocated, but for a simple 6 bits per vector with 4 transmit antennas, the state complexity is $2^{18}$. For Turbo decoding, impressive performances can only be obtained for code length of 10,000 bits with multiple (typical 8 to 10) iterations, and with a posteriori probabilistic or maximum likelihood decoding, which complicates both timing and equipment. Most significantly, what happens if the high-frequency transmission channel is not multipath, Gaussian, Rayleigh, or Ricean fading, and has no meteor insight? What happens if the transmission is completely blocked due to mountain tunneling or concrete jungles?

The above examples illustrate the fact that needs existed and solutions sought. Prior arts limited to Ad Hoc fix leaking bucket approaches. Non-optimal solutions applied only to separate systems of wired or wireless, applicable only to specific degraded transmission channel conditions, or particular frequency range. This invention breaks through such limitations of related art with fundamental results independent of transmission media and operating frequencies with enhanced capabilities in blockage mitigation systems.

For ARQ system evaluation, Peterson and Weldon (*Error Correcting Codes*, MIT Press, 1972) addressed the issue of the probability of an undetected error for block codes used in error detection. By the weights of code words in Hamming codes, the undetected error probability in a binary symmetric channel can be established through the corresponding weight-enumerating polynomial. In practice, it is very difficult to obtain the weight enumerators even with the help of MacWilliam's and Pless's power moment identities (*The Theory of Error-Correcting Codes*, North-Holland, 1977). This invention constructs system efficiency and error probability formulations for all ARQ/FEC based systems evaluations without weight enumeration for unequal terminal capabilities in the transmission network.

SUMMARY OF THE INVENTION

This invention relates to transmission link parameter tradeoffs, multiple applications of error coding techniques, multiple uses of modulation/de-modulation, adaptive channel equalization, and diversity improvement methods. Transmission channel monitoring, detection, classification, and adaptation provide solutions to severe information blockage problems during transmission. Channel monitoring is achieved through two types of detection and re-transmission strategies. Channel detection is accomplished by means of counting the number of negative acknowledgements, which classifies the channel degradation level and determines which alternatives to be adapted in order to combat specific blockage phenomenon. Blockage level is first translated into and related to transmission link parameters in terms of total carrier power to noise ratios, from which the methods of bit rate reduction, modem density increasing, and higher encoding rate are brought forth. A blockage identifier and the optimal smearing technique are used. Frequency-diversity and space-diversity, a method for combating complete blockage and an adaptive programmable channel equalization technique independent of channel characteristics are described. A cascading technique is taught to improve significantly false- and miss-detection probabilities. Performance measure criteria are established for comparison and evaluation utilization in terms of efficiency and blocking mitigation error probability.

This invention provides solutions to the most severe and demanding environments encountered in information transmission: whether with wires or wireless, or whether it is with local area networks, satellites, or deep space communications. The solutions apply to transmission channels including additive white Gaussian, multipath, Rayleigh, and Ricean fading. For satellite orbits, the solutions are applicable to Geo-synchronous earth orbit (GEO), Medium earth orbit (MEO), and Low earth orbit (LEO).

This invention is based on two types of detection and re-transmission schemes. The first scheme determines the blockage severity and classifies it into categories. The second scheme is used to combat complete transmission blockage. Each category consists of a number of blockage mitigation alternatives. Specific implementation designs are included for both types.

Blockage levels are first translated into transmission link parameters, from which the methods of bit rate reduction, increasing modem density, or system bandwidth, or higher encoding rate are derived. Among the alternatives, the methods of improvements in frequency-diversity, space-diversity, and adaptive programmable channel equalization are brought forth.

For blockage due to low signal-to-noise ratio, a method of cascading bits, symbols, and frames enhances significantly the performances of acquisition and synchronization in the beginning of information transmission.

Depending on the degree and duration of blockage, the following factors contributing to transmission blockage need to be characterized: (a) Message traffic congestion, transmission channel capacity, satellite transponder and earth terminal limitations in terms of power and bandwidth; (b) Transmission media such as fading, reflection, shadowing, multi-path, channel symmetry, intentional interferences (jamming), unintentional interferences as adjacent channel, co-channel, inter-symbol, and other short-term and long-term propagation phenomena; and (c) Complete blockage.

The solution methods of this invention are independent of, and applicable to the all the above factors, i.e. traffic congestion, transmission channel characteristics, or interference limitations.

The solution methods of this invention are independent of, and applicable to all the transmission systems, wired or wireless, optical cables or satellites with different transmission carrier frequencies.

The solution methods of this invention are applicable to transmitters and receivers of unequal capabilities in the network.

This invention converts transmission blockage problems into error producing problems. It also introduces system concepts and implementation methods, and advances the unique new applications of Automatic Repeat Request (ARQ) and Forward Error Correction (FEC).

An adaptive system design utilizing the present invention can be automatically realized with switchable short-term, mid-term, long term, and complete blockage categories. The solutions can be easily and cost effectively implemented as demonstrated. System optimization can be achieved by means of dynamic-probabilistic programming at each term category separately.

Signal Acquisition Under Low Signal-to-Noise Ratio: Information detection begins with acquisition. There are three levels of acquisition: bit, carrier, and frame. This part of the invention applies to all three and in particular to frame or sequence acquisition. The performance of acquisition/synchronization is characterized by detection probabilities. FIGS. 1 and 2 are the calculated values of the detection probabilities with respect to the sequence length n, channel bit error rate p, number of tolerable error $t_E$ set in the detector, and the number of frame cascading times $\alpha$. The actual scheme is expected to perform better than the average calculated values.

Channel Detection, Monitoring, and Adaptation: The key characteristic begins with the strategies of transmission channel monitored through the ARQ scheme such as with BCH (31,21,5) code. Transmission is classified in terms of short-term, long-term, and complete blockages. For each blockage classification except complete blockage a number of specific techniques are illustrated. Once a channel classification is determined, adaptation takes place by switching to the corresponding method of mitigation.

Combating Transmission Media Short-term Blockage: When no error is detected, positive acknowledgement (ACK) is transmitted from a receiving terminal; otherwise, negative acknowledgement (NCK) is sent. For blockage less than $\Omega$ number of NCKs, three alternatives are: transmission rate reduction, increasing in modem density and/or increasing the encoding rate.

Combating Transmission Media Mid-term Blockage: At any transmission speed, if the data is missing more than $\Omega$ but less than $\Phi$ number of NCKs, the following provides a solution: Using two modems and an adaptive cancellator, channel blockages can be identified, time smearing techniques can be optimized through unique sequence generation and implemented with specified characteristics.

Combating Transmission Media Long-term Blockage: If the response or no response is greater than $\Phi$ but less than X number of NCKs, techniques are provided to minimize antenna sidelobes for compacting space diversity by means of precise relative phase array antenna locations. Frequency diversity and beam polarization can be improved by minimizing the effect of aliasing (distortion due to spectral overlap), which degrades transmission quality when signals are closely packed for bandwidth conservation. A simple procedure demonstrates the elimination of aliasing without guesswork and then the approach of adaptive programmable channel equalization is introduced.

Combating Complete Blockage: Regardless the type of transmission channel, level of blockage, or for any other reason, when the number of NCK counts reaches X, transmission is considered ceased or is completely blocked for an extensive time due to an unpredictable environment. Under this condition, a simple and effective method is introduced without additional equipment.

These and further and other objects and features of the invention are apparent in the disclosure, which includes the above and ongoing written. specification, with the drawings.

BRIEF DESCRIPTION OF THE DRAWINGS

FIG. 4 shows the error detection and re-transmission arrangement with feed forward and feedback transmission channels.

FIG. 5 shows the error detection mechanism used in FIG. 4 with an encoder, an encoder replica, a test vector and the expected result sequence.

FIG. 6 shows the encoder and encoder replica used in FIG. 5.

DETAILED DESCRIPTION OF THE PREFERRED EMBODIMENTS

Methods of Acquisition/Synchronization (A/S) Sequence Detection and Generation (ACQ): The procedure of the present invention is to cascade either known or unknown sequences, with equal or unequal lengths, to form an extended sequence n, which is the sum of $n_i$, i=1. 2. . . . α. If α such sequences are strung together, the overall A/S detector contains α number of sub-detectors; each one contributes to overall detection process. The combination of the individual detectors determines the state of A/S. For α=4 as an example, the possible outcomes of the detectors $D_1$, $D_2$, $D_3$, $D_4$ are as:

| | | | | | | | | | | | | | | | |
|---|---|---|---|---|---|---|---|---|---|---|---|---|---|---|---|
| $D_1$ | 1 | | 1 | | 1 | | 1 | | 0 | | 0 | | 0 | | 0 |
| $D_2$ | 1 | | 1 | | 0 | | 0 | | 1 | | 1 | | 0 | | 0 |
| $D_3$ | 1 | | 0 | | 1 | | 0 | | 1 | | 0 | | 1 | | 0 |
| S | 1 | | 0 | | 0 | | 1 | | 0 | | 1 | | 1 | | 0 |
| C | 1 | | 1 | | 1 | | 0 | | 1 | | 0 | | 0 | | 0 |
| $D_4$ | 1 | 0 | 1 | 0 | 1 | 0 | 1 | 0 | 1 | 0 | 1 | 0 | 1 | 0 | 1 | 0 |
| W | 4 | 3 | 3 | 2 | 3 | 2 | 2 | 1 | 3 | 2 | 2 | 1 | 2 | 1 | 1 | 0 |
| Decision | 1 | 1 | 1 | 0 | 1 | 0 | 0 | 0 | 1 | 0 | 0 | 0 | 0 | 0 | 0 | 0 |

The detector can be designed with two 3-input binary logic adders. The first adder outputs the sum (S) and carry (C) from $D_1$, $D_2$, $D_3$. With S, C, and $D_4$ as inputs, the second adder provides the weights W. When W≧3, the decision is 1, which implies signal either acquired and/or synchronized.

Figure 2:
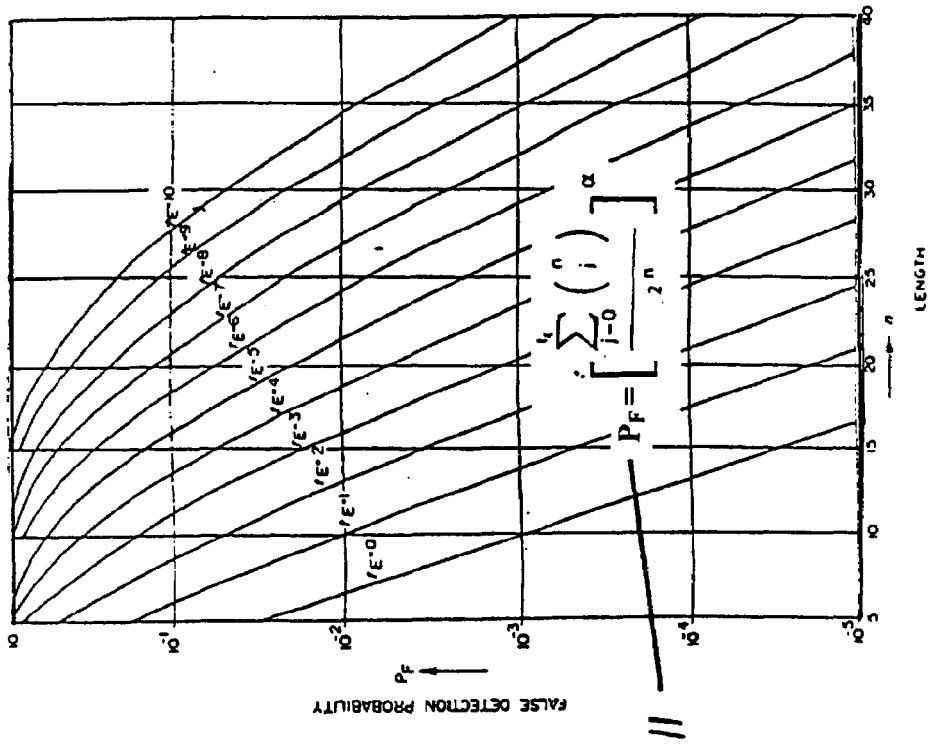
FIG. 2 shows the acquisition sequence false-detection probability with number of tolerable errors $t_E$ setting in the detector and $\alpha=1$ (single sequence length n i=n).
Figure 1:
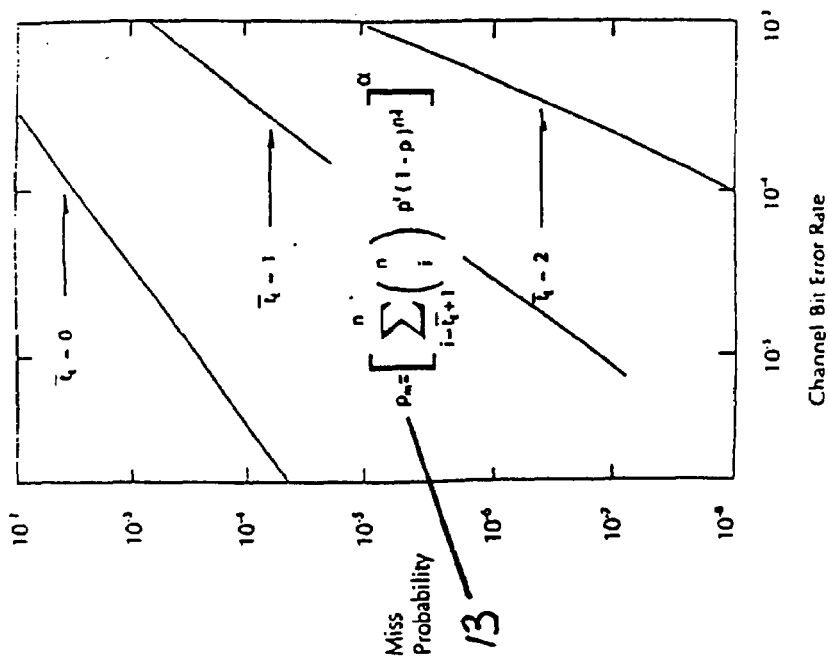
FIG. 1 shows the acquisition sequence miss-detection probability with channel bit error rate p, number of tolerable errors $t_E$ setting in the detector and $\alpha=1$ (single sequence length $n_i=n$).

The key idea of the scheme is that each component probability is less than 1; thus the joint probability or the product of these component probabilities is always much less than 1. The degrees of low false and low miss detection probabilities thus can be determined by a network or system designer as desired. The expressions of $P_f$ 11 and $P_m$ 13 are shown in FIGS. 1 and 2. The total acquisition detection probabilities is the sum of the false detection probability $P_f$, and the miss detection probability $P_m$; each is an a product of false $p_f$ and miss $p_m$ of single frame probabilities. Under low $E_b/N_0$ assume 3 identical frames (α=3) in cascade as an example with each $p_f=p_m=10^{-2}$ (normally they are not equal), then $P_f=P_m=(10^{-2})^3=10^{-6}$. The actual results of using selected sequences should be better than the calculated, which is derived from the averages.

Wu, W. W., *Elements of Digital Satellite Communications, Vol. I: System Alternatives, Analyses, and Optimization*, Computer Science Press, 1984 details procedures to generate component sequences $n_i$, i=1, 2, . . . , α with pre-determined detection probabilities and correlation properties. $n_i$ can be constructed from methods of Bent-Functions, Difference-sets, polynomial multiplication (Gold), Lindner, and Maury-Styles. Binary or non-binary block codes can be applied to all the $n_i$'s to further improve not only the auto- and cross-correlation properties, but also the false and miss detection probabilities. Unique Words (UW) is key to acquisition and synchronization in digital satellite communications. UW refers to a specific set combination of sequences with best auto- and cross correlation properties. Each $n_i$ can be a UW.

Methods of Channel Monitoring, Detection, and Adaptation (MDA)

Figure 3:
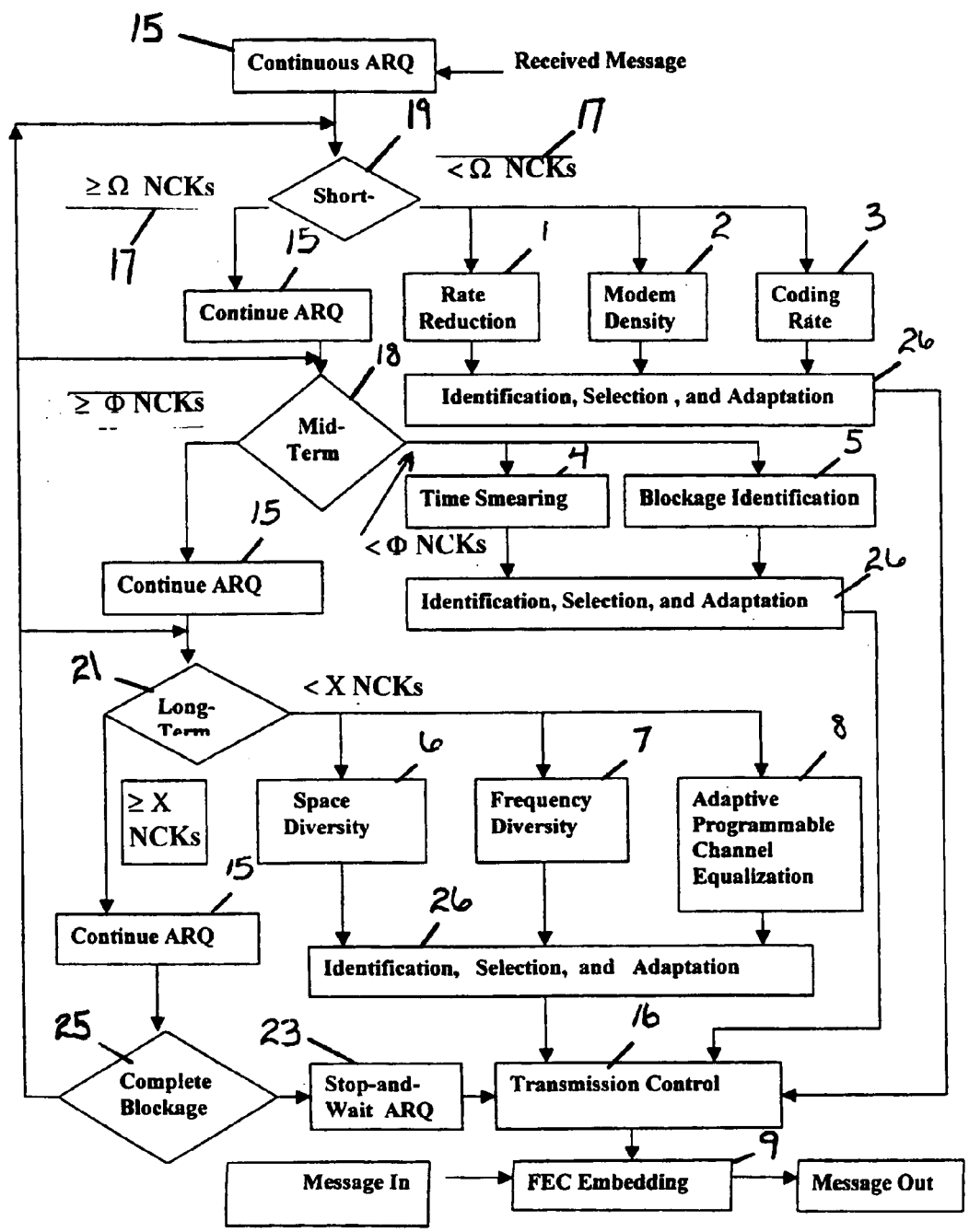
FIG. 3 shows the blockage mitigation technique by means of channel monitoring, detection, and adaptation with the example $\Omega=10$, $\Phi=25$, and X=45, as well as the two types of ARQs and multiple terms with associated blockage mitigation strategies.

Depending on the condition, FIG. 3 outlines the strategies to overcome transmission channel degradations by means of MDA:

Channel Monitoring: Continuous ARQ 15 comprises error detection and re-transmission, which are characterized by positive acknowledgement (ACK) and negative acknowledgement (NCK). By counting the number of NCKs 17, a transmission channel may be monitored into three blockage states: short-term 19, mid-term 18, long-term 21, and complete blockages 23. The numbers of NCK's to determine the states can be changed to fit a particular transmission channel condition. Except for the case of complete blockage 23, each state consists of alternative methods 1 to 8 to combat information blocking. Not all alternatives need to be implemented. After the channel is identified, an alternative method is selected, and the method is then adapted 26. Variations of ARQ operations are based on: Stop-and-Wait, Selective Repeat, Go-back-n, and Continuous. The first one is used for complete blockage 23. The last one is selected for channel monitoring 15. Thus the channel is monitored constantly. These functions are diagrammed in FIG. 3.

Adaptation and Transmission Control: The functions of adaptation are to identify, select, and switch the appropriate mitigation scheme matching with channel condition at that particular time. Known channel statistics and specific satellite parameters, including rate of transmission, will determine how many times the NCK test signals are needed. Adaptation state of short-term is less than Ω NCKs between two ACKs; long-term is greater than Φ NCKs; mid-term is between short- and long-term. After X numbers of NCKs between two ACKs, a complete blockage is declared. Once the blocking state is determined by counting the number of NCKs, adaptation strategies will be performed automatically by switching to the methods as described in FIG. 3. Transmit Control 16 determines which state and which alternative ready for transmission at that time and feeds into FEC Embedding 9.

Method of Implementation: FIG. 4 shows an ARQ arrangement with the availability of both forward 27 and feedback 29, or return transmission channels. The arrangement consists of an Error Encoder 31 and an Error Detector 33, which consists of the identical Encoder replica 35 and a modulo-2 adder as shown in FIG. 5. In encoding, the message 37 is transmitted and stored in the Buffer 39 for retransmission. From the message the Encoder 31 generates the corresponding parity digits. The Control Gate 41 provides timing for the segments of message and parity checks. At the Detector 33 as shown in FIG. 5, the message is received through $S_1$ 43 feeding into the Encoder Replica 35, where the parity checks are regenerated based on the received messages. As soon as the received message block is completed, the received parity checks are switched to $S_2$ 45 from $S_1$ 43. The switches can be easily implemented with timed AND and NAND gates. The Modulo-2 addition can be done either bit by bit, or by using a bank of 10-bit Mod-2 comparator.

ARQ codes have been internationally standardized with generator polynomials from degrees 4 to 32, which specify the encoders. As an example for illustration, the non-standardized (n=31, k=21, d=5) code needs to be used for compatibility reason, which will be clarified in the Section: Combat Channel Errors by Embedment of FEC in ARQ. FIG. 6 shows the Encoder 31. The encoder configuration is determined by the code generator polynomial g(x), which is derived from the product of two minimum polynomials $m^1(x)=1+x^2+x^5$ and $m_3(x)=+x^2+X^3+X^4+X^5$. $g(x)=m_1(x)m_3(x)=+x^3+x^5+x^6+x^8+x^9+x^{10}$. Since the code is cyclic, the parity check polynomial is $h(x)=(x^{31}+1)/g(x)=x^{21}+x^{20}+x^{18}+x^{16}+X^{14}+x^{13}+x^{12}+x^{11}+x^8+x^5++x^3+1$. For the k=21 version of the encoder design, let x=1/D in h(x) multiply by $D^{21}$, $H(D)=1+D+D^3+D^5+D^7+D^8+D^9+D^{10}+D^{13}+D^{16}+D^{18}+D^{21}$ Consider each D is a unit delay, the non-zero terms in H(D) corresponds to the Mod-2 adder connections as shown in FIG. 6. For channel testing purpose, a test signal 101010101010101010101 of 21 bits as message, the expected 10-bits parity check sequence generated by the encoder is: 1110001101. This implementation is used for all the NCK counting schemes described in this invention.

Figure 8:
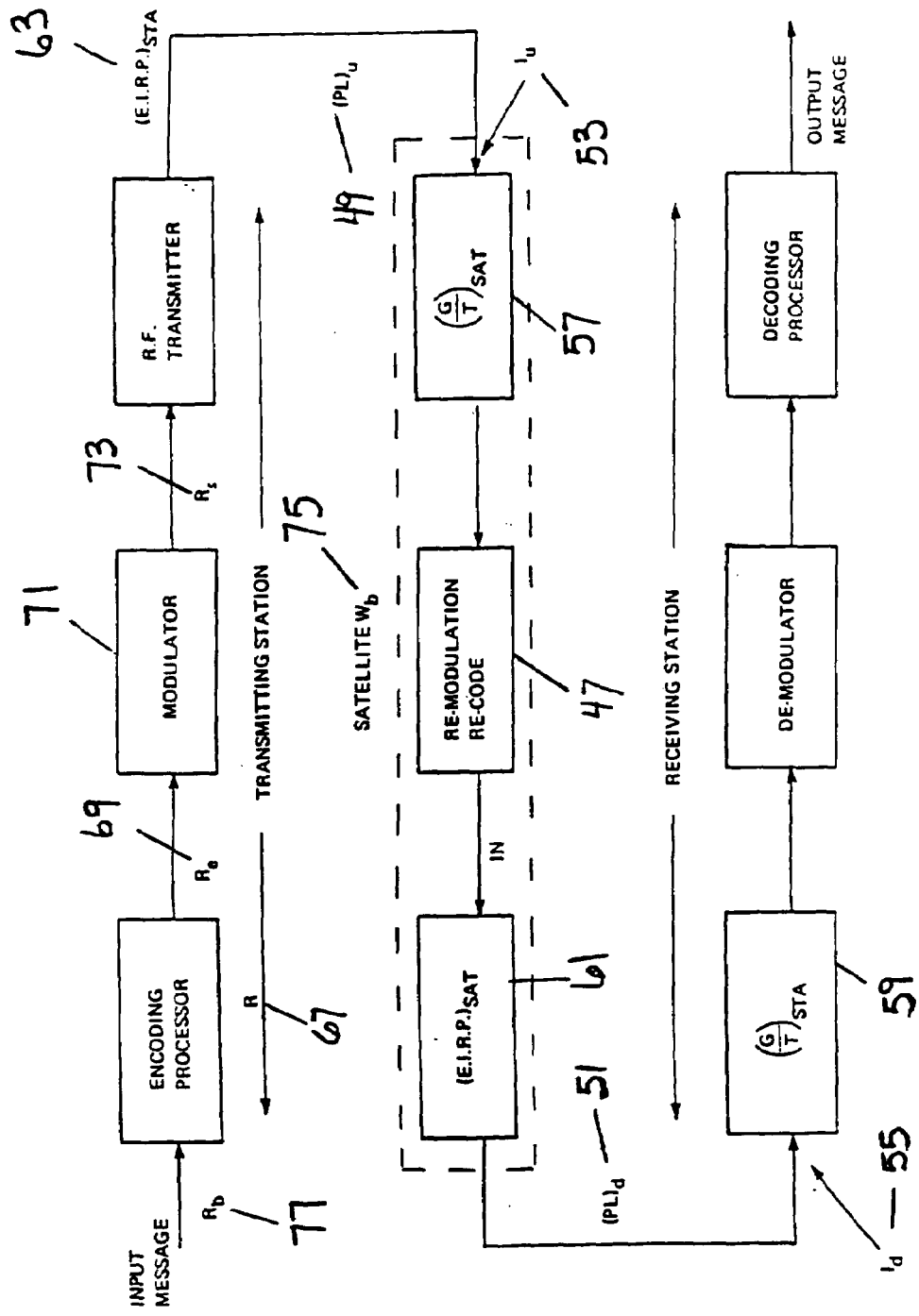
FIG. 8 shows the essential elements of a satellite transmission link with onboard processing.

Blockage in Terms of Transmission Link Parameters: The essential elements of any transmission link consist of the available radio frequency (RF) carrier power-to-noise ratio (C/N), or carrier power-to-noise density ratio ($C/N_0$); the required bit energy ($E_b$) signal-to-noise ratio ($E_b/N_0$), and information bit rate $R_b$. (C/N) is the combined transmitting and receiving carrier-to-noise ratios, which are determined by the antenna gains of both transmission and receiving antennas. $E_b/N_0$ is required to maintain a desired quality communication. Most modulators and de-modulators are specified in terms of $E_b/N_0$ and bit error rate. As an example, FIG. 8 shows a block diagram of the essential elements of a satellite transmission link with simple onboard processing 47. All the blockage losses in the satellite link consist up-link and downlink path losses $(PL)_u$ 49 and $(PL)_d$ 51, and up-link and downlink interferences $I_u$ 53 and $I_d$ 55. $(G/T)_{SAT}$ 57 and $(G/T)_{STA}$ 59 are the ratios of satellite, earth station receiving antenna gains to the system noise temperatures T. $(E.I.R.P.)_{SAT}$ 61 and $(E.I.R.P.)_{STA}$ 63 refer to a satellite and earth station transmitting effective isotropically radiated power, which is defined as the product of a transmitter power and its antenna gain. In the link equation, both $(PL)_u$ 49 and $(PL)_d$ 51 are parts of C/N. The energy per bit after encoding is $E_e=RE_b$, where R 67 is the encoding rate. The corresponding bit rate after encoding is $R_e$ 69. If there are m bits per symbol for the modulation 71, the energy per modulating symbol is $E_s$. At the output of the modulator, the symbol rate is $R_s$ 73. Let $W_b$ 75 be the allocated RF bandwidth in the satellite transponder $N=W_bN_0$ and in terms of the parameters:

$$C/N = E_s R_s / W_b N_0 \tag{1.a}$$

$$= (E_s/W_b N_0)(R_e/m) \tag{1.b}$$

$$= (E_s/mW_b N_0)(R_b/R) \tag{1.c}$$

$$= (E_s/m)(R_b/W_b N_0 R) \tag{1.d}$$

$$= (E_e/N_0)(R_b/W_b R) \tag{1.e}$$

$$= (E_b/N_0)(R_b/W_b). \tag{1.f}$$

If the system or satellite RF bandwidth $W_b$ 75 is fixed and cannot be changed, $$C/N_0 = (E_b/N_0)(R_b) \tag{1.g}$$

Each of the Equations (1. a to g) above can be used effectively in a transmission link to mitigate blockage. Assuming it is desirable to maintain the same link quality through required $E_b/N_0$, the following mitigation techniques can be derived: When the link C/N is degraded due to blockage, and in order to maintain the same $E_s$ and $R_s$, $W_b$ must be increased by the same amount as shown in (1.a). If $W_b$ is fixed and cannot be changed, the remedy is to reduce the output error-encoding rate $R_e$ or increase m as shown in (1.b). If m, $W_b$, and $R_b$ need to remain constant, the only mitigation method is to increase R, or pick a high rate error correcting code as shown in (1.c). If every other parameter in the transmission link cannot be changed, the only solution for the channel blockage or degradation of $C/N_0$ is by decreasing the same amount of $R_b$, the information transmission rate dB by dB as shown in (1.g).

Methods of Combating Short-term Blockage (STB) [ΩNCKs≧C]:

STB refers the counting number C of the negative acknowledgement NCK is less than Ω. For STB, methods of Equations (1.c), (1.e) and (1.g) can be applied as shown in FIG. 3:

Transmission Rate Reduction 1: In order to maintain the same communication quality with fixed $E_b/N_0$, the only remedy from Equation (1.g) for the channel blockage or degradation of $C/N_0$ is by decreasing the same amount of $R_b$ 77, the information transmission rate dB by dB. For example, if there is 30 dB carrier to noise density ratio blockage due to transmission channel degradation as mentioned in the Descriptions of Related Art, the information rate of transmission needs to be reduced is a thousand fold, i.e. from Gbps to Mbps, or from Mbps to Kbps.

Modem Density Increase 2: From Equation (1.c), $E_s/N_0$ can be maintained with the same values of system bandwidth $W_b$, information bit rate $R_b$, and encoding rate R, by increasing the modem density m in terms of bits per symbol. The consequence is to switch to a different modem when the channel blockage is detected. In the example of satellite link of FIG. 8, the modems can be either onboard a satellite or on the ground terminal. The advantages of onboard processing are delay reduction and minimizing re-transmission.

Encoding Rate Increase 3: From Equation (1.e), the communication quality measure $E_e/N_0$ can be maintained to be constant with the same values of $R_b$ and $W_b$, the only choice when C/N decreases due to blockage is to increase the encoding rate R of the error codec. Since each codec is specified by its encoding rate, a different codec or a set of programmable codecs are needed to combat the blockage.

From Eqs. (1.a to g), it is obvious that the methods are not limited to the above three.

Methods of Combating Mid-term Blockage (MTB) [Φ≧C≧C≧Ω NCKs]:

MTB refers the counting number C of the negative acknowledgement NCK is greater or equal to Ω, but less than or equal to Φ. For MTB, following methods are brought forth as shown in FIG. 3:

Time Smearing 4: Time Smearing is recognized by NASA, JPL, and Motorola and suggested by CES of New Zealand. The purpose of this section is to provide an optimal algorithm, derived from its combinatorial set roots. The expected optimal results are the quick generation of large number of sequences for smearing, simple implementation, thus low cost. From its mathematical roots, the algorithm has been proved to be optimum for multi-user and multi-functional (multiple access, user identification, encryption/decryption, spectrum spreading, and time smearing) communication network designs. Steps 1-5 are for the generation of a special set {D} of n elements d's. Two finite fields $F_0=GF(n=p^m)$ with n elements and $F_1=GF(n^2=p^{2m})$ with $n^2$ elements can be constructed. Next, get a set of primitive polynomials f(x) over GF(p). Identify the non-zero elements of the corresponding finite field $F_1$ in terms of the primitive element a satisfying a primitive polynomial $f_0(\sigma)$ of degree 2m. Form two sets of integers z=1, 2, . . . , n; and k=0, 1, . . . , n−2. Each value of z provides a {D}. Choose a value of z and run through the k values in: d(z, k)=z+k(n+1). The elements of {D} are the set of exponents $d_{k+1}$, i.e. exponents of σ. The exponents can be obtained from d(z, k) through the element σ. For n=3, {D}={0,3,1}.

From the elements of the derived {D}, the matrices $[W]_0$. $[W]_1$ can be constructed. With [M], $[B_j]$'s can be obtained. After permuting all the rows of all the $[B_j]$'s, with the assistance of $[A]_k$, a set of matrices $[U]_{i,j}$ is established. All the rows of $[U]_{i,j}$ are the desirable sequences with prescribed properties for non-binary implementation such as using frequency synthesizers, frequency dividers, and delay units. As an example, number of symbols=$n^3$, number of Steps 6-9 generate three matrices Let $[W]_0$, $[W]_1$, and [M] with the d's from Step 5. Combine the rows time divisions=n, number of frequency divisions=$n^2$, minimum distance d=n−1, and the number of sequences=$n^2$ ($n^2$+n+1). For a sequence length n=10, the system can have $10^2(10^2+10+1)$=11,100 users, with $n^3$=1,000 symbols, and tolerate any one symbol overlap in ten symbols.

Example: $[W]_0$=1 6 7], $[W]_1$=[0 4 8], $[B_0]$=[3 18 21 . . . 5 20 23]. With $[A]_0$=[0 1 2, 2 0 1, 1 2 0], $[U]_{I=0,j=0}$=[3 19 23 . . . 4 20 21]. For binary implementation, four more steps are necessary and they are described in the patent application Ser. No. 09/391,900.

Blockage Identifier (BIer) 5: Unintentional blockages consist of adjacent channel, co-channel, and inter-symbol varieties. To reduce these types of blockages, two techniques, frequency spacing and non-linear mathematical programming, are used. When blockage occurs similar to intentional interferences such as jamming, two different de-modulators can be designed to eliminate or minimize such blockages.

Figure 7A:
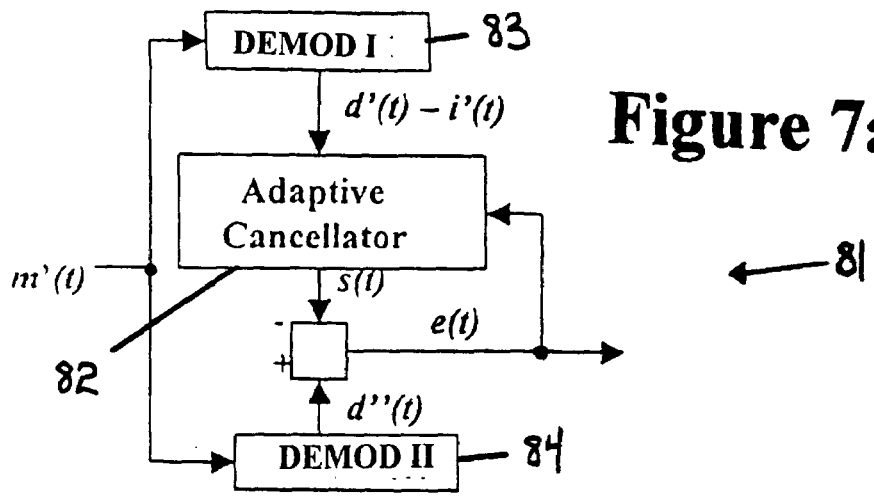
FIG. 7(a) shows the structure of the blockage identifier with two modulators and an adaptive cancellator.
Figure 7B:
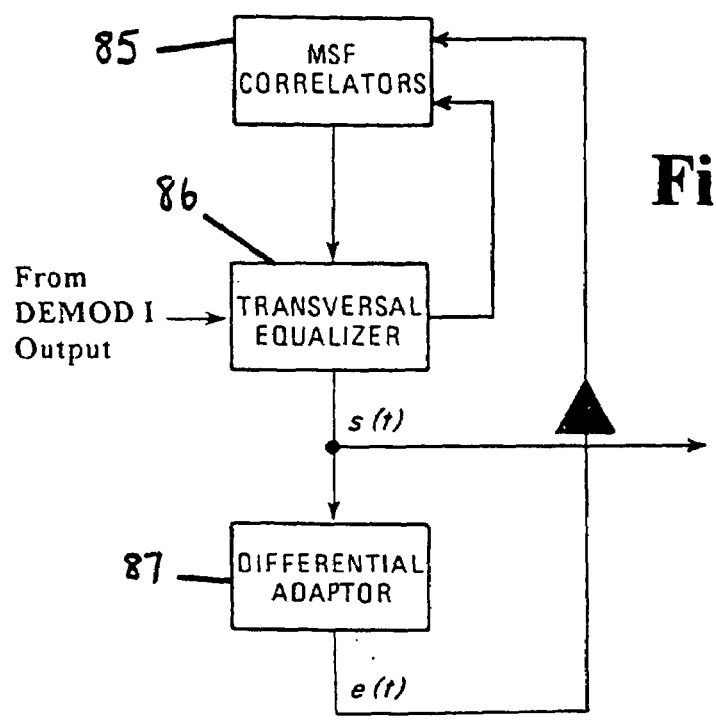
FIG. 7(b) shows the adaptive cancellator used in FIG. 7(a) consisting of a multiplication, sampling, and filtering (MSF) correlator, a transversal equalizer, and a differential adaptor.
Figure 7C:
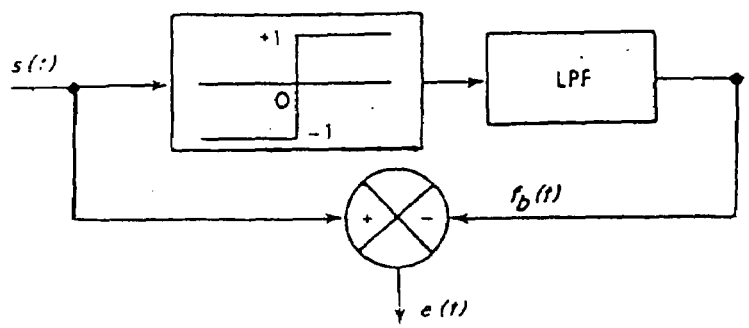
FIG. 7(c) shows the differential adaptor used in FIG. 7(b) consisting of a level detector, a low pass filter (LPF), and a summing comparator.

Let d(t), i(t), n(t) be the data, interference, and noise sequences. The design of the BIer 81 may proceed, as shown in FIG. 7(a,b,c). Let the modulating signal, in general, be denoted as a function of the carrier, the data sequence, and the blockage as: m(t)=F[$\omega_0$t, d(t), b(t)]. After the channel noise n(t), the received signal is: m'(t)=m(t)+n(t)=F[($\omega_0$t, d(t), b(t), $a_n(t)$, $f_n(t)$, $Q_n(t)$], where $a_n(t)$, $f_n(t)$ and $Q_n(t)$ are the amplitude, frequency, and phase noises due to n(t). In demodulation the noises are assumed less significant than blockage, which needs to be identified first and then removed.

The BIer 81 consists of two not identical demodulators 83, 84 as shown in FIG. 7-a, an Adaptive Cancellator 82, which in turn consists of MSF (multiplication, sampling, and filtering) Correlators 85, a Transversal Equalizer 86, as shown in FIG. 7-b, which consists an equal interval tapped delay line with weighting function W, and a summing circuit for all the weights. The delay is inversely proportional to the bandwidth of the input signal, which is the output from DEMOD I 83. The weighting elements control the amplitude and polarity of the delayed signal and the summing circuit combines the set of delayed signals. The adaptive Cancellator 82 also consists of a Differential Adaptor 87, which in turn consists of a low pass filter (LPF) 88, a threshold level detector 89, and a comparator 90 as shown in FIG. 7-c.

Then blockage b'(t) can be identified as: DEMOD I 83 is a conventional carrier remover, and removes only the carrier frequency $\omega_0$t. Thus at the output of Demod I 83, both the estimated sequences d'(t) and b'(t) remain. If DEMOD II 84 is designed to reject (not yet identified) b(t), only the estimated d"(t) should appear at the output of DEMOD II 84. The Adaptive Cancellator 82 then takes the outputs from the two demodulators as it inputs. The objective of the Identifier is to cancel the two demodulated input data sequence d'(t) and d"(t). If d'(t)=d"(t), then the data sequence is expected to be completely canceled. What remains at the output of the Adaptive Cancellator is just the error sequence e(t), which turns into blockage b'(t) after proper detection. The function of the Adaptive Cancellator equalizes the mismatches between the two demodulated data sequences so that the cancellation can be effective. If the cancellation is not perfect, than a threshold level detector 89 can be provided to tolerate a pre-determined amount of impairments.

Methods of Combating Long-Term Blockage (LTB) [X≧C≧Φ NCKs]:

LTB refers the counting number C of the negative acknowledgement NCK is greater or equal to Φ, but less than or equal to X. For LTB, following methods are brought forth as shown in FIG. 3:

Diversity schemes may be used effectively to ease blockage. For satellite communications as an example, frequency allocations, spatial separations, time divisions, polarization, and angle, mode, and/or phase variations can achieve diversity. The problem of diversity application depends on the multiple satellite/earth station antennas, locations of the antennas, system parameters, and transmission channel characteristics, including rain and propagation phenomena, blockage level, and duration.

Space Diversity 6: Multiple antennas to achieve space diversity are well known. But closely packed mobile antennas are often desirable in information transmission. When the distances of the antennas are too close, transmission quality degrades due to antenna sidelobes. When the military is on the move, multiple on-the-move terminals are available. If relative distances among the terminals can be maintained at about the same speed of motion, antennas arrays can be formed to minimize (and in principle eliminate) sidelobes, thus it can be used to combat long-term channel degradation.

Without the advantage of smart antennas, this method to minimize sidelobe effect is originated by David Leeper in his doctorate dissertation. A difference-set [D] with parameters n, k, λ can be obtained with k elements. Each of the elements determines the location of a mobile antenna. For example, {D}={0,1,3} with n=7, k=3, and λ=1 as parameters, the corresponding 3 terminal T locations in the 7 spaces are: T, T, 0, T, 0, 0, 0. The expected sidelobe amplitude is 2/(7d), where d is a spacing distance, the main lobe is 9/(7d), and the aperture is 6d. In general, the sidelobe is (k−λ)/nd, the main lobe is [k+(n−1) λ]/nd. The ratio of sidelobe to main lobe is (n−k)/k(n−1).

Frequency/Polarization Diversity 7: To combat aliasing effect in frequency diversity, the same {D}-set techniques of the previous section can be applied, particularly for FDMA and ODMA. In addition, the technique can be used for mobile satellite transponder optimal frequency assignment. Superceded by the earlier works of Babcock, Edwards, Durkin, Fang, Green, Hirata, Sandrin and Welti, this invention advances the following: Minimization of the third order inter-modulation products for optimal frequency spacing is possible if and only if there exist a simple difference set {D}={$d_0$, $d_1$, . . . $d_{k-1}$} with parameters n, k, λ=1. The total frequency needed is n, the number of frequencies can be assigned is k, and the frequency assignment is precisely according to the elements of {D}. That is, the spaced frequencies are: $f_0=d_0, f_1=d_1, \ldots f_{k-1}=d_{k-1}$.

Adaptive Programmable Channel Equalization 8: Equalization techniques are not new. But the programmable method used in conjunction with blockage mitigation is. All equalizers can adapt to limited channel equalization for performance improvement. By using multiple such limited capabilities to match the channel conditions with automatic programming, the fundamental idea of equalization is elevated to a different level with unique useful application. Using delay D-transform, the sampled impulse response of the baseband transmission channel is X(D). The new approach is sample X(D) during the long-term (L) blockage. Break L into i sub-intervals. Each sampled $x_i(D)$ is adapted with a corresponding $z_i(D)$, such that $z_i(D)$ is the inverse of $x_i(D)$, or $x_i(D)*z_i(D)=1$ for all i times in the L-interval. $z_i(D)$ can be either software or hardware designed to adaptively match $x_i(D)$ for each i. Let i=2 as an example, if $x_2(D)=1+x(D)$, the inverse is $1/[1+x(D)]=1+xD+x^2D^2+\ldots$ is a convergent series for xD<1. Then the second stage equalizer $z_2(D)$ can be designed with x=½ as: $1-D/2+D^2/4-D^3/8+D^4/16-D^5/32$. The coefficients of the D's are the tap gains of the equalizer for i=2. Adaptation is based on each $x_i(D)$ for all sub-timing intervals.

Methods of Combating Complete Channel Blockage (CCB)[C>X NCKs]:

CCB refers the counting number C of the negative acknowledgement NCK is greater than X. For CCB, following method is brought forth as shown in FIG. 3:

For combating complete blockage, the method of Stop-and-wait ARQ is used. The transmitter periodically transmits packetized protocols, and the intended receiver periodically sends ACK. Regardless of the presence types of channel errors or interferences, when the transmitter does not receive any acknowledgement from a receiver for a specified long time and a pre-determined number of NCKs X, the transmitter instantly stops transmitting. Depending on the round trip time delays, the amount of message is stored in the transmitter. Regardless of how long the complete blockage may be, the transmitter will not transmit until the channel is restored through an ACK from the receiver. What happens if errors exist after the transmission is restored, or if a few channel errors cause misidentity of the blockage states? The solution is provided in the following:

Combating Channel Errors by Embedment of FEC in ARQ (EFA) 9: Hybrid ARQ with FEC is also not new. What is new here are the unique embedding methods. For example as shown in FIG. 3 let the constraint length, or a multiple of a convolutional code constraint lengths, equals the message part of the ARQ code, i.e. k=21. As a consequence, the design options include:

Derivation of Block Structured Convolutional Codes (BSC): Applicable to all blockless convolutional codes with maximum likelihood (Viterbi) decoding, sequential decoding, or threshold decoding, the function of conversion from any convolutional code to block code is Application of the BSC method as described in U.S. Pat. No. 6,601,208 B2, a rate 4/5 newly derived block structured threshold decodable convolutional code can be used as the FEC.

With same BSC method, use of three K=7, rate ½ identical convolutional codes with Viterbi decoding, which is commercially available.

From the inventor's computer data bank, select from the known 29 codes with n=21, k=1 to 16, and d=21 to 3. The scheme is making any of the above FEC code words becoming a part of the message in the (31,21,5) ARQ code. As a result, any uncorrected errors will be detected. Away from this specific example, if the ARQ code changes, the last two steps change, but the method stays the same.

Comparison and Evaluation Methods

Without the establishment of a common proper reference measure for performance comparison and system evaluation, no system can claim superior. In this invention, performance criteria are derived from the fundamentals. The results can be practically applied to any ARQ with different transmitter and receiver capabilities.

Figure 9:
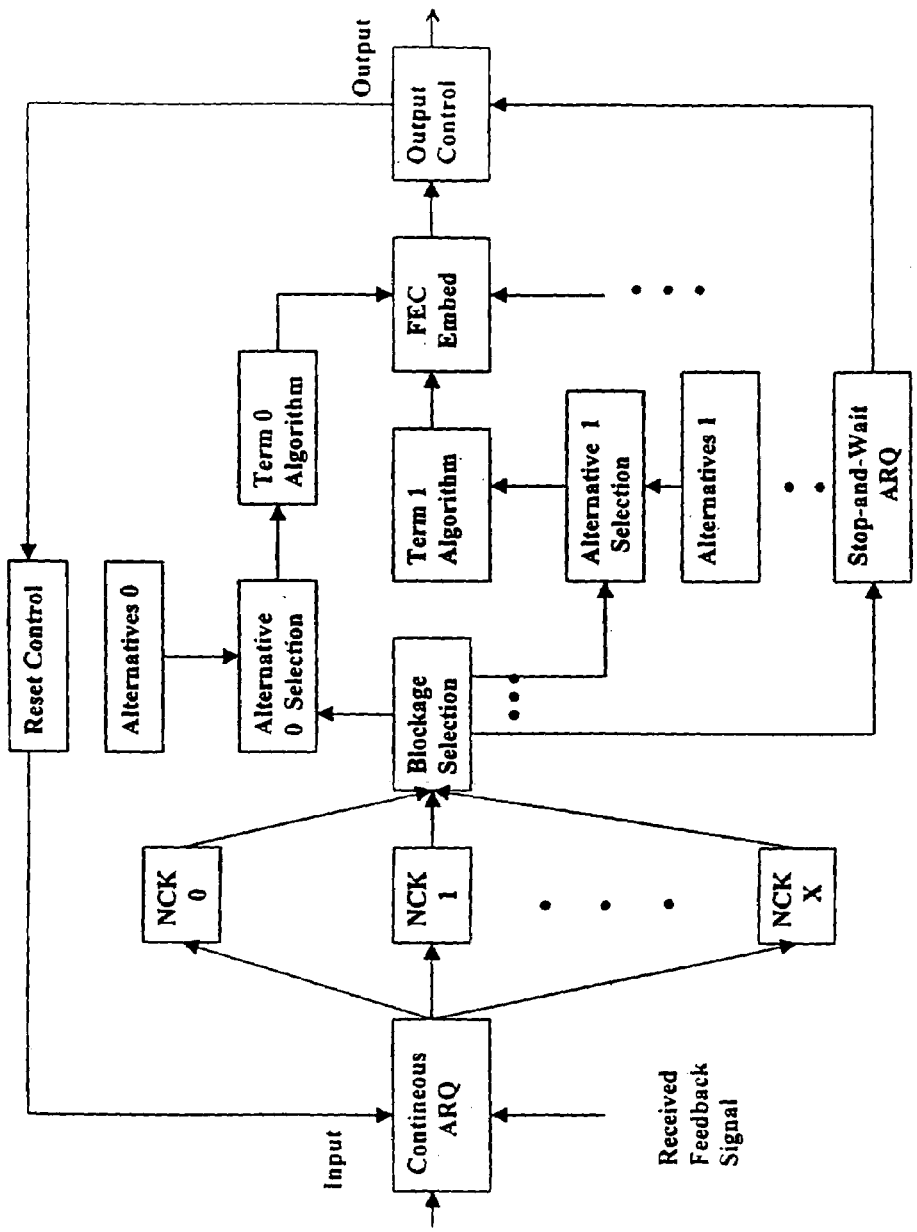
FIG. 9 shows the generalized technique of the transmission blockage mitigation.

Blockage Mitigation System Error Probability:

This invention is based on the examples of FIG. 3 and generalization of FIG. 9. To evaluate the performance of such system, the following formulations are constructed: As shown in FIG. 3 there are 4 levels of Continues ARQs, a single Stop-and-Wait ARQ, and a single stage of ARQ/FEC embedding. Assuming all counting mechanism does not produce any error, the potential errors can only be occurred at each stage of the ARQs. There exist false and undetected (or missed) detection error events in any error detection arrangement including the sequence detection method described in the beginning of this preferred embodiment for acquisition and synchronization (A/S). Since all ARQ schemes are realized by (n, k, d) codes with parity check matrices H, it is well known that error detection is through the formation and recognition of the syndrome sequence s, with information sequence I, and the corresponding error sequence e. The false detection error probability $P_{fd}$ occurs when e is zero but s is not. That is, $P_{fd}=p$ (s≠0, e=0)=p (s≠0/e=0) p(e=0). It is not possible to have s≠0 when e=0. Because $s=(I+e)$ $H^T$, and $IH^T=0$ from the structure of the codes. $H^T$ is the transpose of H. Thus p(s≠0/e=0)=0 and $P_{fd}=0$, which is no longer to be considered.

The undetected errors occur as no detection of errors is made when one or more of errors occurred. This joint error probability is p(s=0, e>0). In terms of code minimum distances d, e>0 consists of two parts: (d−1)≧e≧0 and e>d. Therefore, the probability of undetected error is:

$$P_{ud} = p(s = 0, e > 0) \qquad (2)$$
$$= p[(s = 0), (d-1) \geq e \geq 0] + p[(s = 0), e \geq d]$$
$$= p[(s = 0)/e \geq d]p(e > d).$$

The last expression of Eq (2) is obtained through $s=(I+e)H^T$ and the fact p[(s=0), (d−1)≧e≧0]=0. Evaluating p[(s=0)/e≧d] in Eq. (2), the question is how many s sequence patterns give the all-zero sequence, conditional on the number of channel error per code block equal to or exceeding the code minimum distance? The answer: if an error sequence is equal any linear combination of the rows of H, the zero syndrome will result. The number of rows in H is n−k, and the number of linear combinations of the n−k rows is $$_{(n-k)}C_2 + {_{(n-k)}C_3} + \ldots + {_{(n-k)}C_{(n-k)}} = \sum_i [_{(n-k)}C_i] \qquad (3)$$

Where $_xC_y$ denotes x combination y, and the summation is from i=2, 3, . . . to n−k. With the original n−k rows of H, the summation of Eq. (3) becomes from i=1, 2, 3, . . . to n−k. From the sphere-packing bound for all linear binary codes, $$2^{n-k} \geq \sum_j [_nC_j] \quad (4)$$

This summation is for j=0,1,2, ... E, where E is the number of correctable errors. By the identity of binomial coefficient, and $2^n$ possible sequences in the sample space, $$p[(s=0)/e \geq d] \geq \left(\sum_j [_nC_j] - 1\right) / 2^n \quad (5)$$

If the channel bit error rate is p, the second part of Eq. (2) is $$p(e > d) = \sum_j [_nC_j][p^j(1-p)^{n-j}] \quad (6)$$

Substituting Equations 5 and 6 into Eq. (2), and recognizing the channel differences between transmitter receiver and receiving receiver, such as a base station and a hand-held, the bit error rates p are not the same for ACK and NCK. As a result, the system error rate is bounded by:

$$P_e \geq \sum_\sigma \left\{ \left(\sum_i [_nC_i] - 1\right) / 2^n \right\} \sum_j [_nC_j] \{p^j(\sigma)[1-p^{n-j}(\sigma)]\}, \quad (7)$$

For a pair of different transmission and receiving station capabilities, σ=1,2.

System Efficiency: Both the continuous and the stop-and-wait techniques belong to the family of ARQ, the throughput efficiency of ARQ, $\eta_{(ARQ)}$=(re-transmission rate)(transmission delay)(coding rate)=$\eta_r\eta_t\eta_c$. Let T be the total number of transmitted sequences, $N_n$ the number of received sequences without error, $N_p$ the number of repeated sequences due to ARQ, R=$\eta_c$ the encoding rate, P is the probability of at least one message is in error, and p the transmission channel bit error rate. Then, $\eta_t$=[1/(t+1)], where t is the normalized round trip delay to and from a transmission channel, $\eta_r$=[$N_n$/T]=[(T-$N_p$)/T]=1-P$N_p$. Then, $\eta_{(ARQ)}$=(1-P$N_p$) [1/(t+1)] R. Thus the efficiency of each ARQ technique can be evaluated.

While FIG. 3 describes embodiments with specific examples, modifications and variations of the invention can be constructed without departing from the scope of the principle. FIG. 9 shows such generalized technique of the transmission blockage mitigation.

The invention claimed is:

1. A blockage mitigation method for information transmission systems comprising:
   detecting channels,
   wherein the detecting channels comprises continuous counting of negative acknowledgements received at a transmitter during error detection and retransmission from a receiver;
   partitioning or segmenting the counting,
   wherein the partition or segmentation of the counting is arbitrary;
   monitoring the channels,
   wherein the monitoring channels comprises channel classification and identification,
   adapting blockage mitigation for the channels;
   wherein the adapting the blockage mitigation channels comprises selecting and switching the blockage mitigation; and
   constructing and deriving the blockage mitigation,
   wherein the construction and the derivation of the blockage mitigation measure, compare and evaluate systems performance criteria in terms of error probabilities and efficiencies for the systems comparison and evaluation,
   wherein the selecting and switching the blockage mitigation comprise measuring channel degradations due to blockage, wherein the measuring is performed in terms of total carrier power to noise density ratio.

2. The method of claim 1, wherein the selecting and switching the blockage mitigation further comprises compensating for channel degradation by reducing transmission bit rate dB by dB.

3. The method of claim 2, wherein the measuring is performed in terms of total carrier power to noise density ratios in a transmission link, regardless of system bandwidth, type of modems, or error codecs used.

4. The method of claim 3, further comprising maintaining a consistent level of communication quality through a constant required ratio of transmitting signal energy per bit to noise density.

5. The method of claim 4, wherein total carrier power is the parallel sum of transmitting and receiving antenna power.

6. The method of claim 1, wherein the selecting and switching the blockage mitigation further comprise measuring channel degradation due to blockage compensating by increasing or switching to higher bit per symbol densities of all modems in the transmission link in terms of total carrier power to noise ratio.

7. The method of claim 6, further comprising maintaining consistent system bandwidth, error encoding rate, message bit rate, and level of communication quality.

8. The method of claim 1, wherein the selecting and switching strategies comprise measuring, in terms of total carrier power to noise ratio, the amount of decrease in carrier power due to blockage compensating by increasing or switching to higher rates error correcting codecs in a transmission link.

9. The method of claim 8, further comprising maintaining original modems, message bit rates, system bandwidth, and level of communication quality.

10. The method of claim 1, wherein the selecting and switching strategies comprise one or more of the following steps:
   measuring channel degradations due to blockage compensating by reducing transmission bit rate dB by dB,
   measuring channel degradation due to blockage compensating by increasing or switching to higher bit per symbol density modems in the transmission link, and
   measuring, in terms of total carrier power to noise ratio, the amount of decrease in carrier power due to blockage compensating by increasing or switching to higher rates error correcting codecs in a transmission link.

11. A blockage mitigation method for information transmission systems comprising:
    detecting channels,
        wherein the detecting channels comprises continuous counting of negative acknowledgements received at a transmitter during error detection and retransmission from a receiver;
    partitioning or segmenting the counting,
        wherein the partition or segmentation of the counting is arbitrary;
    monitoring the channels,
        wherein the monitoring channels comprises channel classification and identification,
    adapting blockage mitigation for the channels;
        wherein the adapting the blockage mitigation channels comprises selecting and switching the blockage mitigation; and
    constructing and deriving the blockage mitigation,
        wherein the construction and the derivation of the blockage mitigation measure, compare and evaluate systems performance criteria in terms of error probabilities and efficiencies for the systems comparison and evaluation,
    further comprising:
    identifying blockage through two non-identical modems,
    providing an adaptive cancellator, wherein the adaptive cancellator comprises:
        a correlator for multiplication, sampling, and filtering,
        a transversal filter, and
        a differential adaptor, wherein the differential adaptor comprises a level
    detector and a low pass filter,
    providing an arithmetic unit.

12. The method of claim 11, further comprising providing a frequency-diversity improvement method for minimizing aliasing effect to minimizing blockage comprising systematic application of existing and/or new combinatorial set parameters.

13. The method of claim 11, further comprising providing a space-diversity improvement method for elimination of sidelobes for compacting antenna locations comprising the automatic and systematic applications of existing and/or new combinatorial sets.

14. The method of claim 11, further comprising providing a time smearing method comprising:
    non-binary sequence generation,
    implementation comprising frequency dividers, time delay units, and an assembler at
    a receiver, and
    automatic and systematic applications of existing and/or new combinatorial sets.

15. The method of claim 14, further comprising set generation.

16. The method of claim 11, further comprising adaptive programmable channel equalization wider known or unknown transmission channel conditions, comprising sampling, sequence adaptation, inverse matching, and channel equalization.

17. The method of claim 1, wherein if transmission blockage is complete, utilizing a stop-and-wait method by counting excessive number of negative acknowledgements, and resuming transmission with a next positive acknowledgement declared by the detection and re-transmission scheme.

18. The method of claim 11, further comprising utilizing both continuous and stop-and-wait methods, wherein the continuous and stop-and-wait methods further comprise using a single error correcting encoder, a replica of the encoder, and a single or a bank of modulo-2 adders.

19. The method of claim 18, wherein the continuous and stop-and-wait methods further comprise using a (31, 21, 5) code derivation, encoder design configuration, test vector generation, and wherein both block codes and convolutional codes are applicable for the detection and re-transmission process.

20. The method of claim 11, further comprising utilizing a cascading approach under blockage or low signal-to-noise ratio transmission channel conditions for bit, symbol, and frame acquisition and synchronization for creating significantly lower false- and miss-detection probabilities.

21. A communication blockage mitigation method comprising:
    acquiring bit, carrier and frame signals,
    detecting sequences in the frame signals,
    calculating sequence lengths n, channel bit error rate p, tolerable error $t_E$ and number
    of frame cascading times,
    detecting channel signal transmission characteristics,
    detecting signal transmission blockages,
    classifying the signal transmission blockages as short term, mid term, long term or complete, and
    providing blockage mitigation alternatives which differ according to the classification of short, mid and long term or complete transmission blockage,
    adapting to the blockages by switching between mitigation alternatives according to the classifying.

22. The method of claim 21, further comprising detecting errors in the signals at a receiving terminal, when no error is detected transmitting positive acknowledgment from a receiving terminal, and otherwise sending negative acknowledgments.

23. The method of claim 22, wherein for blockages of less than $\Omega$, sending negative acknowledgment, classifying the blockages as short term, and wherein the mitigation technique further comprises reducing transmission rate, increasing modem density or increasing encoding rate.

24. The method of claim 22, wherein for blockages of more than $\Omega$, but less than $\Phi$, sending negative acknowledgment, classifying the blockages as mid term, and wherein the mitigation technique further comprises using two modems and an adaptive cancellator, identifying channel blockages and optimizing time smearing with unique sequence generation and characteristics.

25. The method of claim 22, wherein for blockages of more than $\Phi$, but less than x, sending negative acknowledgment, classifying the blockages as long term, and wherein the mitigation technique further comprises minimizing sidelobes by precisely locating antennas, minimizing aliasing by assigning frequencies or adaptively equalizing programmable channels.

26. The method of claim 22, wherein for blockages greater than x, stopping transmitting until positive acknowledgment is received from the receiver, then resuming transmission.

27. A method of measuring information transmission characteristics comprising establishing methods of performance measure criteria for utilization of comparison and evaluation applicable to an error detection system in information transmission systems where transmitter and receiver capabilities are different, such as to and from base stations and handheld units and to and from base stations and communication satellites, wherein the establishing further comprises calculating values of detection probabilities of sequence length, and channel bit error rate, and number of tolerable errors in the transmission system acquiring signals from the transmission systems in bit, carrier and frame or sequence levels classifying transmission system blockages according to automatic repeat requests in the acquired signals, or positive and negative act as short, mid or long term blockages or complete blockages according to the calculated values.

28. The method of claim 27, wherein for blockages of less than $\Omega$, sending negative acknowledgment, classifying the blockages as short term, and wherein the mitigation technique further comprises reducing transmission rate, increasing modem density or increasing encoding rate, wherein for blockages of more than $\Omega$, but less than $\Phi$, sending negative acknowledgment, classifying the blockages as mid term, and wherein the mitigation technique further comprises using two modems and an adaptive cancellator, identifying channel blockages and optimizing time smearing with unique sequence generation and characteristics, wherein for blockages of more than $\Phi$, but less than x, sending negative acknowledgment, classifying the blockages as long term, and wherein the mitigation technique further comprises minimizing sidelobes by precisely locating antennas, minimizing aliasing by assigning frequencies or adaptively equalizing programmable channels, and wherein for blockages greater than x, stopping transmitting until positive acknowledgment is received from the receiver, then resuming transmission.

* * * * *